(12) United States Patent
Geary et al.

(10) Patent No.: US 9,131,412 B2
(45) Date of Patent: Sep. 8, 2015

(54) SIGNALING RADIO BEARER SECURITY HANDLING FOR SINGLE RADIO VOICE CALL CONTINUITY OPERATION

(75) Inventors: Stuart I. Geary, Fleet (GB); Steven Franklin, Guildford (GB); Keiichi Kubota, Weybridge (GB)

(73) Assignee: Nokia Technologies Oy, Espoo (FI)

( * ) Notice: Subject to any disclaimer, the term of this patent is extended or adjusted under 35 U.S.C. 154(b) by 126 days.

(21) Appl. No.: 13/068,001

(22) Filed: Apr. 29, 2011

(65) Prior Publication Data

US 2011/0274085 A1 Nov. 10, 2011

Related U.S. Application Data

(60) Provisional application No. 61/395,115, filed on May 7, 2010.

(51) Int. Cl.
| | | |
|---|---|---|
| *H04W 4/00* | (2009.01) | |
| *H04W 36/00* | (2009.01) | |
| *H04W 12/02* | (2009.01) | |
| *H04W 12/04* | (2009.01) | |

(52) U.S. Cl.
CPC .......... *H04W 36/0022* (2013.01); *H04W 12/02* (2013.01); *H04W 12/04* (2013.01)

(58) Field of Classification Search
CPC .. H04L 2463/061; H04L 63/06; H04L 1/1664
USPC .................................. 370/331, 352; 709/331
See application file for complete search history.

(56) References Cited

U.S. PATENT DOCUMENTS

| | | | | |
|---|---|---|---|---|
| 2007/0254667 A1* | 11/2007 | Jokinen | ......................... | 455/436 |
| 2008/0002594 A1* | 1/2008 | Forsberg et al. | .............. | 370/252 |
| 2008/0205345 A1* | 8/2008 | Sachs et al. | ................... | 370/332 |
| 2008/0240439 A1* | 10/2008 | Mukherjee et al. | ........... | 380/272 |
| 2008/0310367 A1* | 12/2008 | Meylan | ......................... | 370/331 |

(Continued)

FOREIGN PATENT DOCUMENTS

| | | | | |
|---|---|---|---|---|
| DE | 102005035723 B3 * | 2/2007 | ............. | H04L 29/06 |
| EP | 2 346 274 A1 | 7/2011 | | |

(Continued)

OTHER PUBLICATIONS

3GPP, ETSI TS 123060 V9.3.0 Digital cellular telecommunications system (Phase 2+) 3GPP TS 23.060 version 9.3.0 Release 9), ETSI Jan. 2010, V 9.3.0 release 9, 278-283.*

(Continued)

*Primary Examiner* — Brian J Gillis
*Assistant Examiner* — Shean Tokuta
(74) *Attorney, Agent, or Firm* — Harrington & Smith

(57) ABSTRACT

The exemplary embodiments of the invention provide at least a method, apparatus, and computer program to detect a single radio voice call continuity activation event indicating a handover of a user equipment between a packet switched domain and a circuit switched domain, consistent with a serving radio network subsystem relocation procedure, suspend control plane signaling radio bearers, reset the suspended signaling radio bearers, and resume the suspended signaling radio bearers in the domain handed over to, where resuming comprises protecting control plane signaling radio bearers of a domain handed over to using a same mapped security key that is used to cipher user plane radio access bearers in the domain handed over to.

16 Claims, 4 Drawing Sheets

(56) References Cited

U.S. PATENT DOCUMENTS

| | | |
|---|---|---|
| 2010/0135246 A1* | 6/2010 | Hallental .................... 370/331 |
| 2010/0195621 A1* | 8/2010 | Kekki et al. ................. 370/332 |
| 2011/0176680 A1* | 7/2011 | Wu ............................... 380/277 |

FOREIGN PATENT DOCUMENTS

| | | | |
|---|---|---|---|
| WO | WO 2008/023162 A2 | 2/2008 | |
| WO | WO 2008148429 A1 * | 12/2008 | ............ H04W 36/14 |
| WO | WO 2009044222 A1 * | 4/2009 | ............ H04W 36/14 |
| WO | WO-2010/044729 A1 | 4/2010 | |
| WO | WO 2010052514 A2 * | 5/2010 | ............ H04W 12/02 |
| WO | WO 2011/021091 A1 | 2/2011 | |
| WO | WO 2011/039655 A1 | 4/2011 | |

OTHER PUBLICATIONS

Orhanou, et al, "EPS Confidentiality and Integrity Mechanisms Algorithm Approach", International Journal of Computer Science Issues, vol. 7, Issue 4, No. 4, (Jul. 2010), (pp. 15-23).

* cited by examiner

SIGNALING RADIO BEARER SECURITY HANDLING FOR SINGLE RADIO VOICE CALL CONTINUITY OPERATION

CROSS-REFERENCE TO RELATED APPLICATIONS

This patent application claims priority under 35 U.S.C. §119(e) from Provisional Patent Application No. 61/395,115, filed May 7, 2010, the disclosure of which is incorporated by reference herein in its entirety.

TECHNICAL FIELD

The exemplary and non-limiting embodiments of this invention relate generally to wireless communication systems, methods, devices and computer programs and, more specifically, relate to handover procedures used to transition an on-going voice call between packet switched and circuit switched domains.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:
3GPP third generation partnership project
C-plane control plane
CK_cs CS cipher key
CK_ps PS cipher key
CS circuit switched
EDGE enhanced data rates for GSM evolution
E-UTRAN evolved universal terrestrial radio access network
GERAN GSM/EDGE radio access network
GGSN gateway GPRS support node
GPRS general packet radio service
GSM global system for mobile communications
HSPA high speed packet access
IK_cs CS integrity key
IK_ps PS integrity key
IMS internet protocol multimedia subsystem
MSC mobile switching center
NAS non-access stratum
NW network
PS packet switched
RAB radio access bearer
RAT radio access technology
RNC radio network controller
SGSN serving gateway support node
SK security key
SN sequence number
SRB signaling radio bearer
SRNS serving radio network subsystem
SRVCC single radio voice call continuity
UE user equipment
U-plane user plane
(U)SIM (UMTS) subscriber identity module
UTRAN universal terrestrial radio access network
UMTS universal mobile telecommunications system
VLR visited location register
VoIP voice over internet protocol SRVCC operation is described by 3GPP TS 23.216 V9.3.0 (2010-03) Technical Specification 3rd Generation Partnership Project; Technical Specification Group Services and System Aspects; Single Radio Voice Call Continuity (SRVCC); Stage 2 (Release 9).

As is defined in 3GPP TS 23.216, single radio voice call continuity refers to voice call continuity between IMS over PS access and CS access for calls that are anchored in the IMS. The UE is assumed capable of transmitting/receiving on only one of these access networks at a given time. A 3GPP SRVCC UE is defined as a UE that is enhanced for IMS service continuity with the additional UE capabilities described in 3GPP TS 23.216 for SRVCC between E-UTRAN and 3GPP UTRAN and/or between E-UTRAN and 3GPP GERAN and/or between UTRAN (HSPA) and 3GPP UTRAN and 3GPP GERAN.

SRVCC allows a voice call to be handed over from a PS connection to a CS connection. As can be appreciated, this is essentially a handover from a VoIP call over a data bearer to a traditional voice call over a circuit switched bearer. The SRVCC feature allows the rollout of VoIP by providing inter-working between old and new systems.

Reference can also be made to 3GPP TS 33.102 V9.2.0 (2010-03) Technical Specification 3rd Generation Partnership Project; Technical Specification Group Services and System Aspects; 3G Security; Security architecture (Release 9), and to 3GPP TS 33.401 V9.3.1 (2010-04) Technical Specification 3rd Generation Partnership Project; Technical Specification Group Services and System Aspects; 3GPP System Architecture Evolution (SAE); Security architecture (Release 9). For example, 3GPP TS 33.401, Section 14, "SRVCC between E-UTRAN and Circuit Switched UTRAN/GERAN" references 3GPP TS 23.216.

However, 3GPP TS 23.216 does not deal with at least some security issues associated with the handover between NAS domains. In particular, methods for key handling are absent.

SUMMARY

In an exemplary aspect of the invention, there is a method comprising detecting a single radio voice call continuity activation event indicating a handover of a user equipment between a packet switched domain and a circuit switched domain, consistent with a serving radio network subsystem relocation procedure, suspending control plane signaling radio bearers, resetting the suspended signaling radio bearers, and resuming the suspended signaling radio bearers in the domain handed over to, where resuming comprises protecting control plane signaling radio bearers of a domain handed over to using a same mapped security key that is used to cipher user plane radio access bearers in the domain handed over to.

In another exemplary aspect of the invention, there is an apparatus comprising at least one data processor, and at least one computer readable memory including computer program code, where the at least one computer readable memory and the computer program code are configured, with the at least one data processor, to cause the apparatus to at least: detect a single radio voice call continuity activation event indicating a handover of a user equipment between a packet switched domain and a circuit switched domain, consistent with a serving radio network subsystem relocation procedure, suspend control plane signaling radio bearers, reset the suspended signaling radio bearers, and resume the suspended signaling radio bearers in the domain handed over to, where resuming comprises protecting control plane signaling radio bearers of a domain handed over to using a same mapped security key that is used to cipher user plane radio access bearers in the domain handed over to.

In still another exemplary aspect of the invention, there is an apparatus, comprising: means for detecting a single radio voice call continuity activation event indicating a handover of a user equipment between a packet switched domain and a circuit switched domain, means, consistent with a serving radio network subsystem relocation procedure, for suspending control plane signaling radio bearers, means for resetting the suspended signaling radio bearers, and means for resuming the suspended signaling radio bearers in the domain handed over to, where resuming comprises protecting control plane signaling radio bearers of a domain handed over to using a same mapped security key that is used to cipher user plane radio access bearers in the domain handed over to.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

Key mapping has been standardized in 3GPP TS 25.331 V9.2.1 (2010-04) Technical Specification 3rd Generation Partnership Project; Technical Specification Group Radio Access Network; Radio Resource Control (RRC); Protocol specification (Release 9).

At least one security aspect remained unresolved having the potential to ultimately inhibit practical deployments. More specifically, an unresolved issue relates to the change of ciphering and integrity for signaling radio bearers (SRBs) during SRVCC. The exemplary embodiments of this invention pertain to and address at least this issue.

The term 'ciphering and integrity' is commonly referred to as 'protection', and can be understood as such in the ensuing description of the exemplary embodiments.

Figure 1:
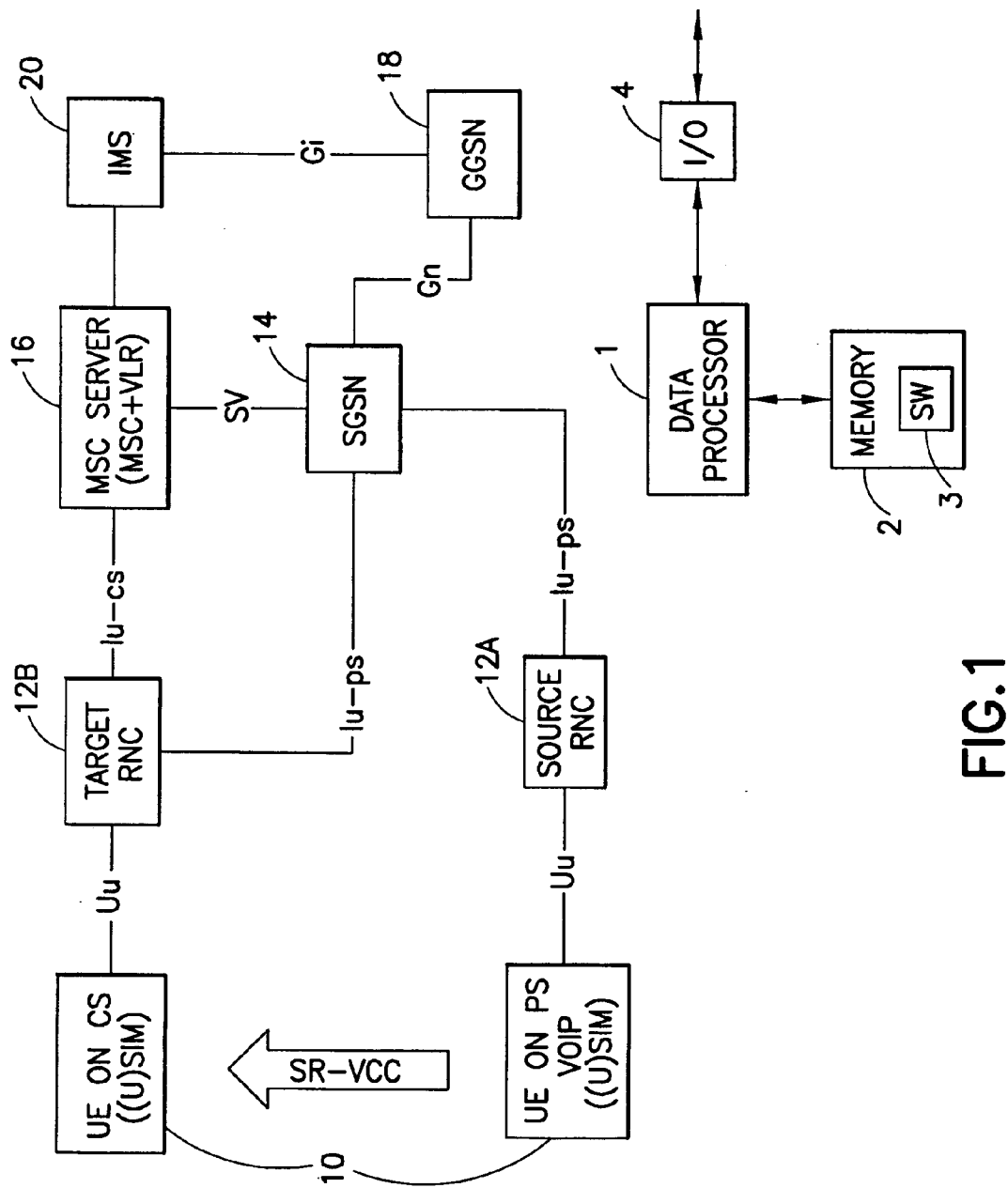
FIG. 1 is simplified block diagram of a system architecture that is relevant to the exemplary embodiments of this invention.

FIG. 1 shows an exemplary system architecture that is relevant to the exemplary embodiments. In FIG. 1 there is a UE 10 that first is engaged with a PS NW for VoIP (via a Uu interface), and that then transitions (is handed over) to a CS NW to continue the voice call, again via the Uu interface. Relatedly there is a source (original) RNC 12A and a target (subsequent) RNC 12B. RNC 12A is connected with a SGSN 14 via an Iu-ps interface. The target RNC 12B is also connected to the SGSN 14 via an Iu-ps interface, while also being connected to a MSC server (MSC plus VLR) via an Iu-cs interface. The SGSN 14 has a connection via a Gn interface to a GGSN 18. The GGSN 18 is connected to an IMS 20 via a Gi interface. The MSC 16 is also connected to the IMS 20.

It can be noted in FIG. 1 that the source RNC 12A and the target RNC 12B may be the same RNC. The signaling diagrams shown in FIGS. 2 and 3 and discussed below assume the non-limiting case that there is a single RNC for the UTRAN to UTRAN use case.

In FIG. 1 the RNC(s) 12, SGSN 14, MSC server 16, GGSN 18 and the IMS 20 may be generally considered to constitute the network (NW).

Note also that FIG. 1 shows but one possible and non-limiting NW configuration. Other NW options and other radio access technologies are made apparent in the above-referenced 3GPP TS 23.216.

It can also be noted in FIG. 1 that the voice call is anchored in the IMS 20 and may be routed via the CS or PS domains. The voice call continues to flow through the IMS 20 but can be considered to be relocated: e.g., within the UE 10; from source RAN to target RAN; from the SGSN 14 to the MSC server 16.

The handling of non-voice bearers is not shown in FIG. 1 to simplify the depiction.

FIG. 1 also shows an exemplary data processor 1 connected with a memory 2 storing computer program code (software SW) 3. Also shown is a suitable input/output (I/O) module/circuit 4 providing bidirectional connectivity between the data processor 1 and external agents/systems. The illustrated components 1, 2, 3 and 4 can be understood to form the technical hardware and software basis of each of the UE 10, RNCs 12A, 12B, SGSN 14, MSC server 16, GGSN 18 and IMS 20. In each case the SW 3 is understood to include program instructions that, when executed by the associated data processor 1, perform the operations appropriate for the host device. In certain of these devices the SW 3 will include program instructions configured to execute methods in accordance with the exemplary embodiments of this invention. For the case of the UE 10 the I/O circuit 4 can be implemented using at least one wireless (e.g., radio frequency) transceiver for bi-directional connectivity with the RNCs 12A, 12B via a wireless network access node, such as a base station or Node B or evolved Node B (eNB), not shown in FIG. 1.

In general, the various embodiments of the UE 10 can include, but are not limited to, cellular telephones and any other type of portable device having wireless communication capabilities and capable of supporting a voice call. The computer-readable memory 2 may be of any type suitable to the local technical environment and may be implemented using any suitable data storage technology, such as semiconductor based memory devices, random access memory, read only memory, programmable read only memory, flash memory, magnetic memory devices and systems, optical memory devices and systems, fixed memory and removable memory. The data processor 1 may be of any type suitable to the local technical environment, and may include one or more of general purpose computers, special purpose computers, microprocessors, digital signal processors (DSPs) and processors based on multi-core processor architectures, as non-limiting examples.

A problem that arises in a conventional system relates to the point of handover from the PS to the CS domain. At this time the SRBs may be protected by either the previous CS or PS key set, where "previous" means the key set in use prior to the handover. The problem occurs when the SRBs (C-plane) were protected by the previous CS key set and during SRVCC a new CS key set is mapped for ciphering the CS RABs (U-plane). The end result leaves the UE 10 and the NW maintaining two different CS keys, one set for the C-plane and one set for the U-plane. This condition is not allowed and represents an error case.

At least the aforementioned specification(s), if followed as defined, would leave the UE 10 and the NW in an uncertain and unsustainable state.

In accordance with the exemplary embodiments of this invention several methods are provided to overcome the foregoing problem.

In a first method, and after the handover from the PS to the CS domain RAB, the UE 10 and NW always use the mapped CS keys for the purpose of protecting the SRBs. This method avoids the case where two CS keys exist and need to be maintained. Essentially in all cases then the security keys used to protect the SRBs are replaced with the same mapped CS key used to cipher the CS RABs.

This approach, however, can introduce a new issue with respect to synchronizing the change of ciphering of the SRBs. This issue is considered and resolved by use of the second method.

In the second method a change of protection on the SRBs uses UE 10 and NW synchronization of SRB sequence numbers (SNs). For the SRVCC from UTRAN to UTRAN use case, which uses radio bearer setup messaging, there is no sequence number (SN) synchronization method available. As such, in this embodiment a synchronization method is employed as previously used for SRNS relocation. In this case all SRBs are suspended, reset and resumed in a controlled manner that is consistent with the SRNS relocation procedure. Any SRVCC procedure therefore behaves as if a change of RNC had occurred. This second method thus facilitates the implementation of the first method.

As is known in the art, SRNS relocation is used to move the control of a UE connection from a source (old serving) RNC to a target (new serving) RNC. This means that both the control and user plane are moved to the target (new serving) RNC. Reference with regard to SRNS relocation can be made to, for example, 3GPP TS 25.303 V9.0.0 (2009-12) Technical Specification 3rd Generation Partnership Project; Technical Specification Group Radio Access Network; Interlayer procedures in Connected Mode (Release 9), specifically section 6.4.8, SRNS Relocation, pages 53-61.

Note that the procedure employed herein is consistent with the SRNS Relocation procedure at least to the extent that the SN synchronization procedure is reused as if SRNS Relocation had actually occurred.

The exemplary embodiments of this invention can also be used to change the SRB protection in the other direction (from the CS to the PS domain), where similar methods can be employed.

Figure 2:
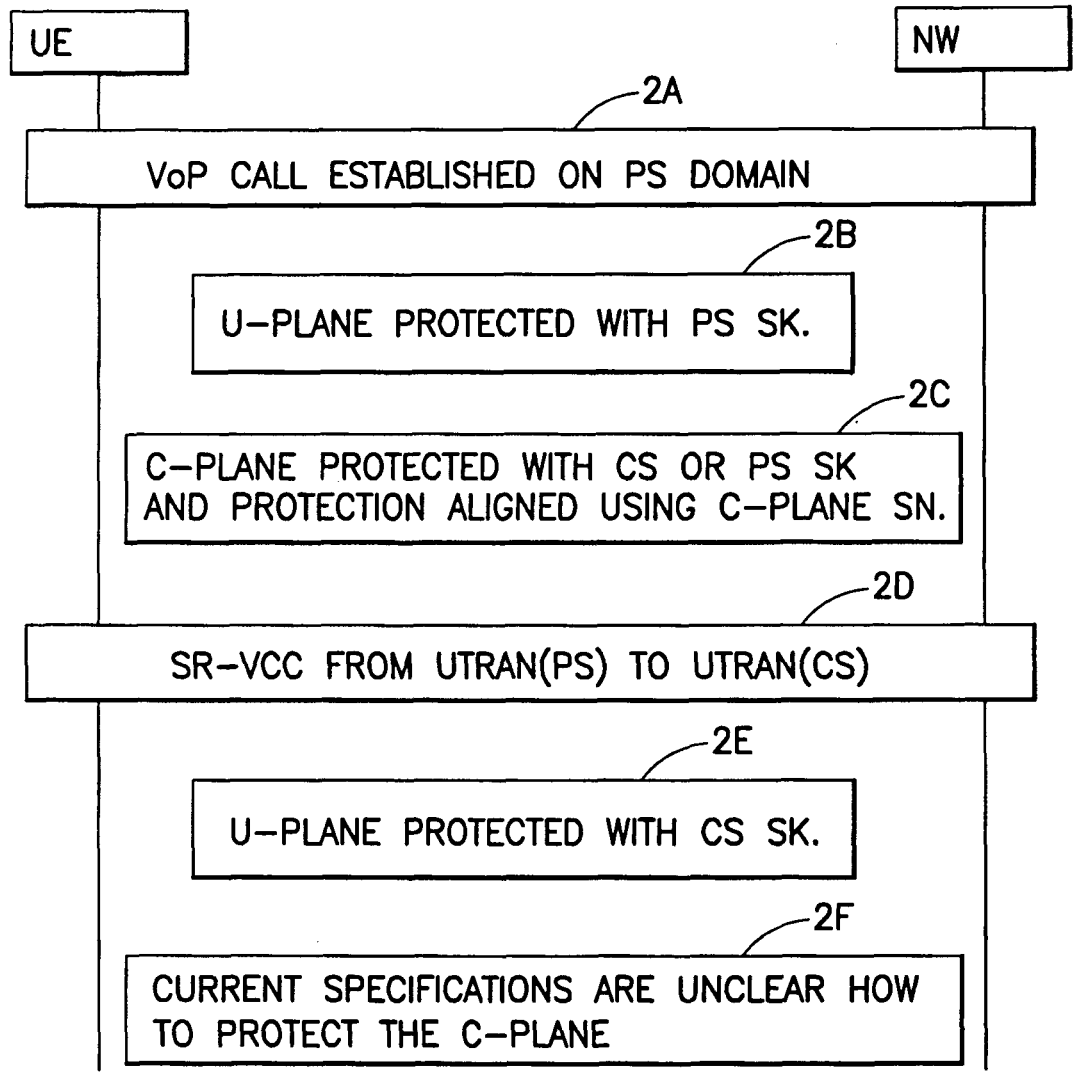
FIG. 2 illustrates conventional signaling for a UTRAN to UTRAN case.
Figure 3:
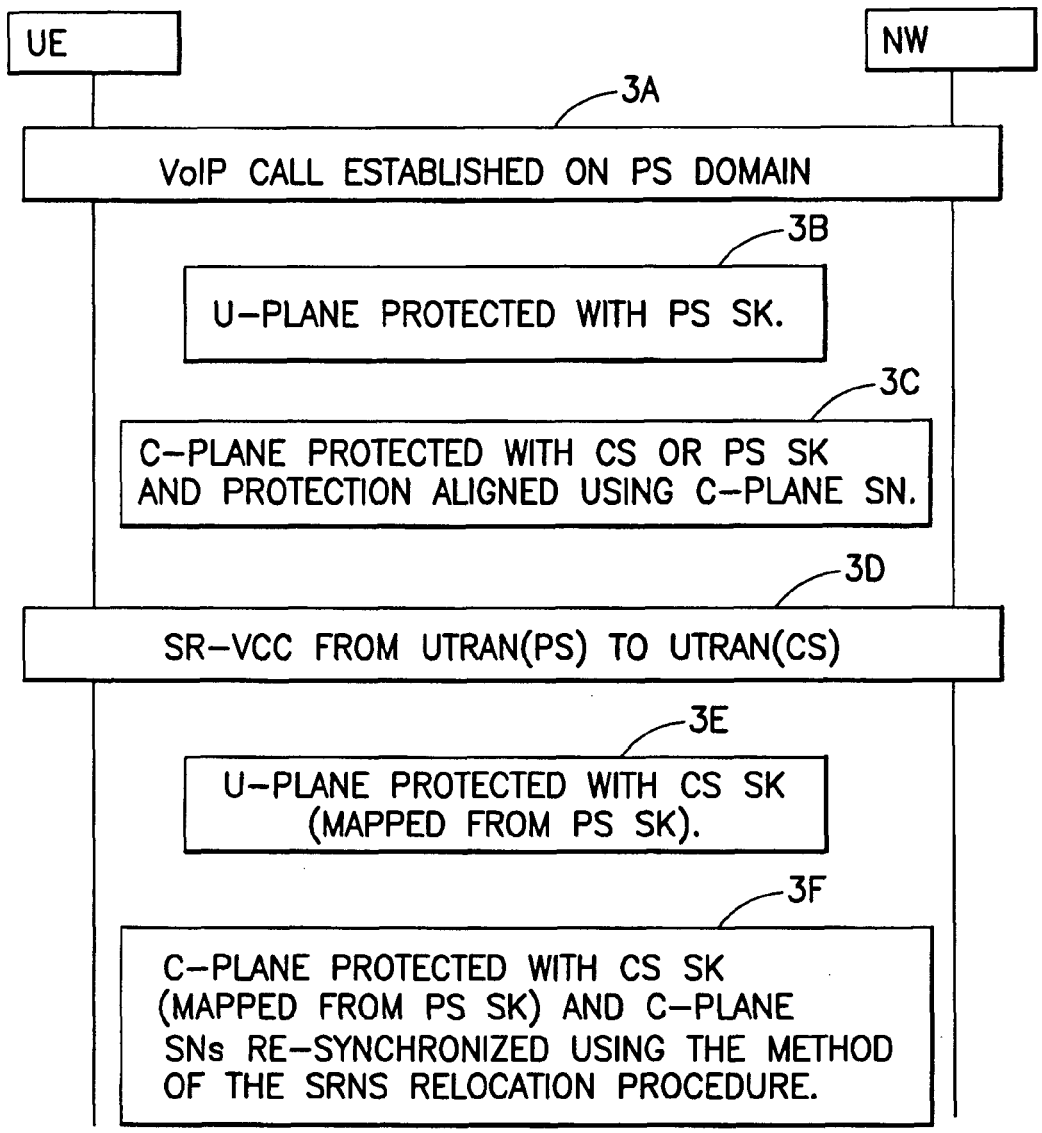
FIG. 3 illustrates signaling for the UTRAN to UTRAN case in accordance with exemplary embodiments of this invention.

The examples depicted in FIGS. 2 and 3 show for simplicity the UTRAN to UTRAN case only (i.e., an intra-RAT case), however the use of the exemplary embodiments can be extended to other radio technologies as well, as well as to inter-RAT cases.

FIG. 2 shows a conventional case for interactions between the UE 10 and the NW. At 2A a VOID call is established over the PS domain. 2B indicates that the U-plane is protected with the PS SK. 2C indicates that the C-plane is protected with either the CS SK or the PS SK, with protection aligned using the C-plane SNs. At 2D SRVCC is performed from the UTRAN PS domain to the UTRAN CS domain. 2E indicates that the U-plane is protected with the CS SK mapped from the PS SK. However, as indicated in 2F it can be seen that the above-referenced problem arises, as in accordance with current specifications it is unclear as to how to protect the C-plane channels, i.e., using the PS CK or the CS CK.

Referring now to FIG. 3, the above referenced problem is addressed and solved in accordance with the exemplary embodiments of this invention. Note that the operations 3A, 3B, 3C, 3D and 3E can be identical to the operations 2A, 2B, 2C, 2D and 2E, respectively, of FIG. 2. However, as shown in 3F the C-plane channels use the CS SK mapped from the PS SK, similar to the U-plane channels. The C-plane SNs used for the C-plane channels are re-synchronized using the re-synchronisation method of the SRNS relocation procedure, i.e., the SRBs are suspended, reset and resumed in a controlled manner that is consistent with the SRNS relocation procedure.

Note that, with regard to the second method disclosed above, an alternative may be used where the radio bearer setup messaging is updated to include SN synchronization capability. This approach does not, however, reduce the benefits obtained by the use of the first method.

The exemplary embodiments can be practiced at least in part by revisions to certain specification and standards documents. For example, in 3GPP TS 25.331 some or all of the following sub-sections may be revised: 8.1.12, Security mode control; 8.2.2.3, Reception of radio bearer setup or radio bearer reconfiguration or radio bearer release or transport channel reconfiguration or physical channel reconfiguration message or target cell HS-SCCH order by the UE; 8.2.2.4, Transmission of a response message by the UE, normal case; 8.6.3.4, Ciphering mode info; 8.6.3.5, Integrity protection mode info; 8.6.4.2, RAB information for setup; 8.6.4.3 RB information to setup; and 8.6.3.15, SR-VCC info, as non-limiting examples.

At least one technical effect that is achieved is that security is maintained for SRBs across the SRVCC procedure while avoiding complex key handling situations.

At least one further technical effect that is achieved is that no security weaknesses are introduced into the SRVCC procedure.

Another technical effect that is achieved is that the SRB SN synchronization makes use of a safe restart procedure which has been proven in previous NW deployments.

Based on the foregoing it should be apparent that the exemplary embodiments of this invention provide a method, apparatus and computer program(s) to accommodate a SRVCC hand over between PS and CS domains without a loss of C-plane SRB protection and without introducing ambiguity and non-allowed system states.

Figure 4:
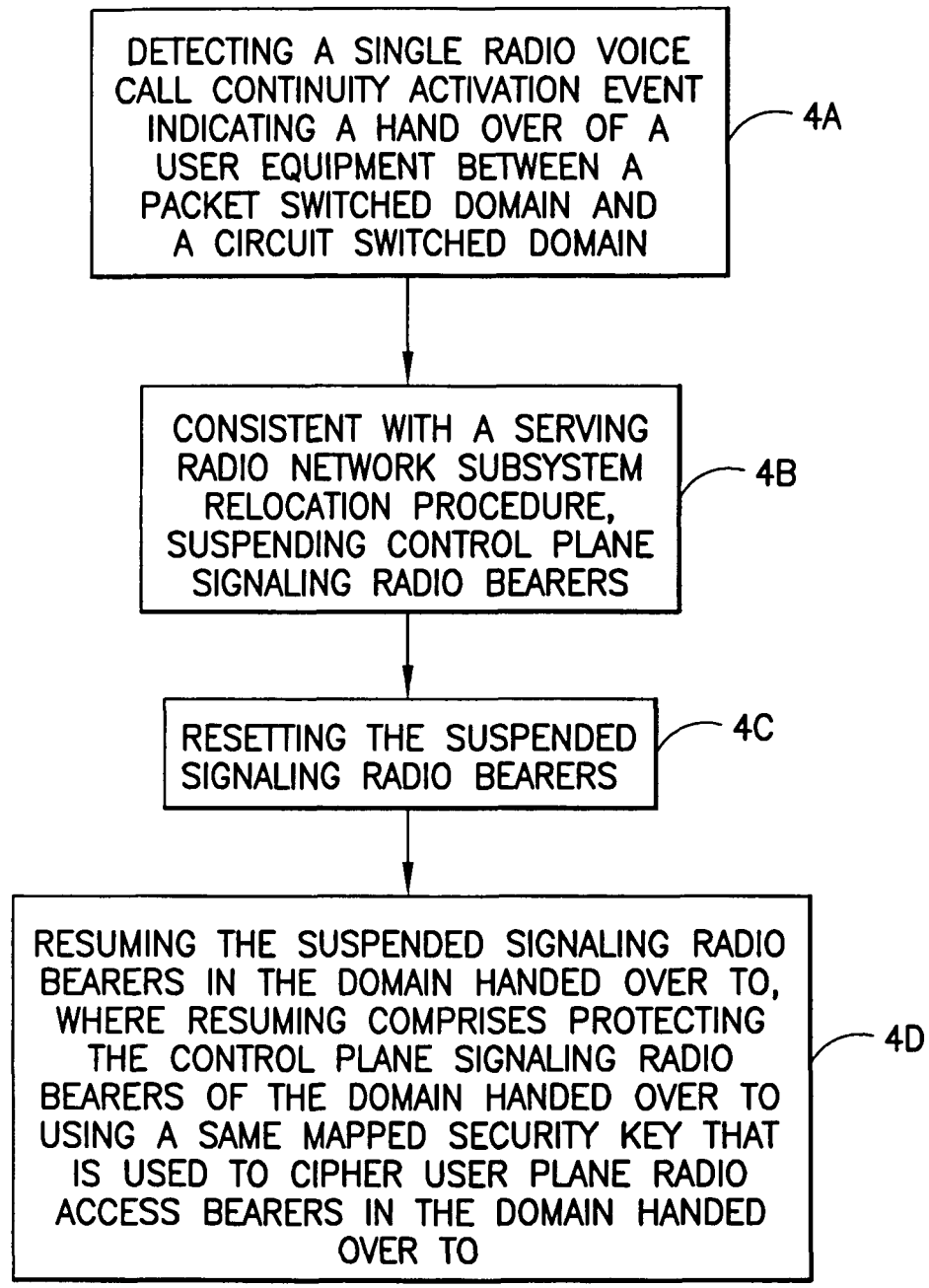
FIG. 4 is a logic flow diagram which each illustrate the operation of a method, and a result of execution of computer program instructions embodied on a computer readable memory, in accordance with the exemplary embodiments of this invention.

FIG. 4 is a logic flow diagram that illustrates the operation of a method, and a result of execution of computer program instructions, in accordance with the exemplary embodiments of this invention. In accordance with these exemplary embodiments a method performs, at Block 4A, a step of detecting a single radio voice call continuity activation event indicating a hand over of a user equipment between a packet switched domain and a circuit switched domain. At Block 4B, consistent with a serving radio network subsystem relocation procedure, there is a step of suspending control plane signaling radio bearers; at Block 4C there is a step of resetting the suspended signaling radio bearers; and at Block 4D there is a step of resuming the suspended signaling radio bearers in the domain handed over to, where resuming comprises protecting the control plane signaling radio bearers of the domain handed over to using a same mapped security key that is used to cipher user plane radio access bearers in the domain handed over to.

The method as in FIG. 4, where the domain handed over to is the circuit switched domain.

The method as in FIG. 4, where the domain handed over to is the packet switched domain.

The method as in FIG. 4, where the hand over is from a voice over internet protocol voice call to a circuit switched voice call.

The method as in FIG. 4, where the hand over is from a circuit switched voice call to a voice over internet protocol voice call.

The method as in either one of the preceding two paragraphs, where the call is anchored at an internet protocol multimedia subsystem.

The method as in any one of the preceding paragraphs, where the control plane signaling radio bearers and the user plane radio access bearers are established between the user equipment and a radio network controller, where the single radio voice call continuity hand over is accomplished within a single radio network controller or is accomplished between two radio network controllers.

The method as in any one of the preceding paragraphs, where the single radio voice call continuity hand over is accomplished as an intra-radio access technology hand over or as an inter-radio access technology hand over.

The various blocks shown in FIG. 4 may be viewed as method steps, and/or as operations that result from operation of computer program code, and/or as a plurality of coupled logic circuit elements constructed to carry out the associated function(s).

The exemplary embodiments thus also encompass a non-transitory computer-readable medium that contains software program instructions, where execution of the software program instructions by at least one data processor results in performance of operations that comprise execution of the methods depicted in FIG. 4.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The exemplary embodiments thus also encompass an apparatus that comprises a processor and a memory including computer program code. The memory and computer program code are configured to, with the processor, cause the apparatus at least to detect a single radio voice call continuity activation event indicating a hand over of a user equipment between a packet switched domain and a circuit switched domain and, consistent with a serving radio network subsystem relocation procedure, to suspend control plane signaling radio bearers, to reset the suspended signaling radio bearers and to resume the suspended signaling radio bearers in the domain handed over to so as to protect the control plane signaling radio bearers of the domain handed over to using a same mapped security key that is used to cipher user plane radio access bearers in the domain handed over to.

The exemplary embodiments also encompass an apparatus that comprises means for detecting a single radio voice call continuity activation event indicating a hand over of a user equipment between a packet switched domain and a circuit switched domain; means, operating consistent with a serving radio network subsystem relocation procedure, for suspending control plane signaling radio bearers; for resetting the suspended signaling radio bearers; and for resuming the suspended signaling radio bearers in the domain handed over to, where resuming comprises protecting the control plane signaling radio bearers of the domain handed over to using a same mapped security key that is used to cipher user plane radio access bearers in the domain handed over to.

The exemplary embodiments thus also encompass an apparatus that comprises a processor and a memory including computer program code. The memory and computer program code are configured to, with the processor, cause the apparatus at least to detect a single radio voice call continuity activation event indicating a hand over of a user equipment and, consistent with a serving radio network subsystem relocation procedure, to suspend control plane signaling radio bearers, to reset the suspended signaling radio bearers and to resume the suspended signaling radio bearers in the domain handed over to so as to protect the control plane signaling radio bearers of the domain handed over to using a same mapped security key that is used to cipher user plane radio access bearers in the domain handed over to.

It should be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, and while the exemplary embodiments have been described above at least partially in the context of the UTRAN system, it should be appreciated that the exemplary embodiments of this invention are not limited for use with only this one particular type of wireless communication system, and that they may be used to advantage in other wireless communication systems and radio access technologies.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters, security keys and the like are not intended to be limiting in any respect, as these parameters and security keys may be identified by any suitable names. Further, the various names assigned to different network elements (e.g., RNC, SGSN, IMS, etc.) are not intended to be limiting in any respect, as these various network elements may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
   detecting a single radio voice call continuity activation event indicating a handover of control plane signaling radio bearers for a voice call of a user equipment between a packet switched domain and a circuit switched domain;
   consistent with a serving radio network subsystem relocation procedure, suspending the control plane signaling radio bearers;
   resetting the suspended control plane signaling radio bearers; and
   after the handover, resuming the suspended control plane signaling radio bearers in a domain handed over to, where resuming comprises protecting the control plane signaling radio bearers of the voice call in the domain handed over to using a security key that is used to cipher user plane radio access bearers for the voice call in the domain handed over to, and synchronizing a sequence number of the resumed control plane signaling radio bearers of the voice call, where the synchronizing comprises synchronizing a sequence number of the control plane signaling radio bearers with a sequence number of the user plane radio access bearers for the voice call in the domain handed over to, where the security key is mapped to a same security key used to protect the control plane signaling radio bearers of the voice call prior to the handover in a source one of the packet switched domain and the circuit switched domain.

2. The method as in claim 1, comprising one of the control plane signaling radio bearers of the voice call are handed over from the circuit switched domain to the packet switched domain or handed over from the packet switched domain to the circuit switched domain.

3. The method as in claim 1, where the handover is one of from a voice over internet protocol voice call to a circuit switched voice call or from a circuit switched voice call to a voice over internet protocol voice call.

4. The method as in claim 1, where the voice call is anchored at an internet protocol multimedia subsystem.

5. The method as in claim 1, where the control plane signaling radio bearers and the user plane radio access bearers are established between the user equipment and a radio network controller, where the single radio voice call continuity hand over is accomplished within a single radio network controller or is accomplished between two radio network controllers.

6. The method as in claim 1, where the single radio voice call continuity handover is accomplished as an intra-radio access technology handover or as an inter-radio access technology hand over.

7. At least one memory and at least one computer program code configured, with at least one data processor, to perform the method as in claim 1.

8. An apparatus comprising:
   at least one data processor; and
   at least one non-transitory computer readable memory including computer program code, where the at least one non-transitory computer readable memory and the computer program code are configured, with the at least one data processor, to cause the apparatus to at least:
   detect a single radio voice call continuity activation event indicating a handover of control plane signaling radio bearers of a voice call of a user equipment between a packet switched domain and a circuit switched domain;
   consistent with a serving radio network subsystem relocation procedure, suspend the control plane signaling radio bearers;
   reset the suspended control plane signaling radio bearers; and
   after the handover, resume the suspended control plane signaling radio bearers in a domain handed over to, where resuming comprises protecting the control plane signaling radio bearers of the voice call in the domain handed over to using a security key that is used to cipher user plane radio access bearers in the domain handed over to, and synchronize a sequence number of the resumed control plane signaling radio bearers of the voice call, where the synchronizing comprises synchronizing a sequence number of the control plane signaling radio bearers with a sequence number of the user plane radio access bearers for the voice call in the domain handed over to, where the security key is mapped to a same security key used to protect the control plane signaling radio bearers of the voice call prior to the handover in a source one of the packet switched domain and the circuit switched domain.

9. The apparatus as in claim 8, comprising one of the control plane signaling radio bearers of the voice call is handed over from the circuit switched domain to the packet switched domain or the voice call is handed over from the packet switched domain to the circuit switched domain.

10. The apparatus as in claim 8, where the handover is one of from a voice over internet protocol voice call to a circuit switched voice call or from a circuit switched voice call to a voice over internet protocol voice call.

11. The apparatus as in claim 8, where the voice call is anchored at an internet protocol multimedia subsystem.

12. The apparatus as in claim 8, where the at least one computer readable memory and the computer program code are configured, with the at least one data processor, to establish the control plane signaling radio bearers and the user plane radio access bearers between the user equipment and a radio network controller, where the single radio voice call continuity hand over is accomplished within a single radio network controller or is accomplished between two radio network controllers.

13. The apparatus as in claim 8, where the single radio voice call continuity handover is accomplished as an intra-radio access technology handover or as an inter-radio access technology hand over.

14. The apparatus of claim 8, where the apparatus comprises an integrated circuit disposed within a mobile platform.

15. The method according to claim 1, where the synchronizing occurs upon an activation of the single radio voice call continuity activation event.

16. The apparatus of claim 8, where the synchronizing occurs upon an activation of the single radio voice call continuity activation event.

* * * * *